(12) United States Patent
Navarro, Sr.

(10) Patent No.: US 10,150,192 B1
(45) Date of Patent: Dec. 11, 2018

(54) ALIGNMENT TOOL AND METHOD OF USE

(71) Applicant: Joseph R. Navarro, Sr., Mooresville, NC (US)

(72) Inventor: Joseph R. Navarro, Sr., Mooresville, NC (US)

(*) Notice: Subject to any disclaimer, the term of this patent is extended or adjusted under 35 U.S.C. 154(b) by 58 days.

(21) Appl. No.: 15/231,718

(22) Filed: Aug. 8, 2016

Related U.S. Application Data (60) Provisional application No. 62/202,513, filed on Aug. 7, 2015.

(51) Int. Cl.
*B23Q 3/18* (2006.01)
*G01B 5/25* (2006.01)

(52) U.S. Cl.
CPC ............... *B23Q 3/186* (2013.01); *G01B 5/25* (2013.01)

(58) Field of Classification Search
CPC .................................. B23Q 3/186; G01B 5/25
USPC .......... 33/281, 296, 374–376, 382–383, 518, 33/613, 642, 813, 823, 828, 832–833
See application file for complete search history.

(56) References Cited

U.S. PATENT DOCUMENTS

| | | | | | |
|---|---|---|---|---|---|
| 2,365,353 | A | * | 12/1944 | Morris | G01B 3/24 33/507 |
| 2,994,963 | A | * | 8/1961 | Turner | G01B 5/0018 33/501.05 |
| 3,216,119 | A | * | 11/1965 | Street | B25D 5/02 33/642 |
| 3,688,412 | A | * | 9/1972 | Keener | G01B 5/245 33/474 |
| 3,848,339 | A | * | 11/1974 | Strasbaugh | G01B 3/24 33/507 |
| 4,006,529 | A | * | 2/1977 | Herman | G01B 5/0002 33/548 |
| 4,106,240 | A | * | 8/1978 | De Bartolo | B24B 9/16 33/832 |
| 4,251,922 | A | * | 2/1981 | Perlotto | B23Q 17/2225 33/1 M |
| 4,406,069 | A | * | 9/1983 | Clement | G01B 5/245 33/520 |
| 4,437,803 | A | * | 3/1984 | Volna | B23Q 17/2258 33/642 |
| 4,646,441 | A | * | 3/1987 | Kearney | G01B 5/25 33/559 |
| 5,036,595 | A | * | 8/1991 | Nevery | B23Q 17/2258 248/904 |
| 5,131,161 | A | * | 7/1992 | Drag | G01B 5/245 33/533 |
| 5,133,135 | A | * | 7/1992 | Durfee, Jr. | G01B 5/245 33/427 |

(Continued)

*Primary Examiner* — R. A. Smith
*Assistant Examiner* — Tania Courson
(74) *Attorney, Agent, or Firm* — Robert J. Yarbrough; Lipton, Weinberger & Husick (57) ABSTRACT

An alignment tool provides for aligning the spindle of a machine tool to a work holding feature of the machine tool. The alignment tool may include one indicator or may include a first indicator and a second indicator in a spaced-apart relation. The faces of the indicators are rotatable. In use, a machinist may attach the indicators to the spindle of a machine tool, advance the spindle or work holding feature until the indicator tips contact the work holding feature. The machinist can rotate the faces so that the machinist can read the indicator faces without placing the machinist's head within the envelope of tool movement of the machine tool.

20 Claims, 8 Drawing Sheets

(56) References Cited

U.S. PATENT DOCUMENTS

| | | | | |
|---|---|---|---|---|
| 5,205,046 A * | 4/1993 | Barnett | ............... | G01B 5/285 33/533 |
| 5,454,170 A * | 10/1995 | Cook | ............... | B23Q 17/22 33/533 |
| 6,832,440 B2 * | 12/2004 | Navarro, Sr. | ............... | G01B 5/245 33/626 |
| 7,065,897 B2 * | 6/2006 | Luner | ............... | G01B 3/28 29/407.05 |
| 7,069,666 B2 * | 7/2006 | Navarro | ............... | B23Q 17/22 33/626 |
| 7,841,102 B2 * | 11/2010 | Xiao | ............... | G01B 3/22 33/813 |
| 8,201,813 B2 * | 6/2012 | Maciejewski | ............... | G02B 23/22 269/266 |
| 8,266,810 B2 * | 9/2012 | Gordon | ............... | B23Q 17/2233 33/502 |
| 8,341,823 B1 * | 1/2013 | Maciejewski | ............... | G02B 23/22 269/254 CS |
| 8,584,372 B2 * | 11/2013 | Stoffel | ............... | G01B 5/25 33/628 |
| 9,403,252 B2 * | 8/2016 | Gordon | ............... | B23Q 3/066 |
| D798,176 S * | 9/2017 | Gordon | ............... | D10/102 |
| 2008/0155846 A1 * | 7/2008 | Li | ............... | G01B 3/22 33/533 |
| 2011/0131826 A1 * | 6/2011 | Gordon | ............... | B23Q 17/2233 33/642 |
| 2015/0367465 A1 * | 12/2015 | Gordon | ............... | B23Q 3/066 409/225 |

\* cited by examiner

Fig. 9

ALIGNMENT TOOL AND METHOD OF USE

I. RELATED APPLICATIONS

This non-provisional application claims priority from U.S. provisional patent application 62/202,513 by Joseph Navarro filed Aug. 7, 2015. Provisional application 62/202,513 is hereby incorporated by reference as if set forth in full herein.

II. BACKGROUND OF THE INVENTION

A. Field of the Invention

The Invention is a tool for aligning the spindle of a machine tool to the work-holding feature of the machine tool, with particular application to computer numerical controlled ('CNC') machine tools. The Invention is also a method of using the alignment tool. The Invention allows a machinist to orient the work-holding feature of the CNC machine tool to the spindle of the CNC machine tool without requiring the machinist to move from one location and without requiring that the machinist move his or her head into the envelope of tool movement of the machine tool. The Invention is also useful for aligning the spindle of a manual machine tool.

B. Statement of the Related Art

In a milling machine, the rotating spindle of the machine tool holds a cutting tool that rotates with the spindle. The work piece is secured to a work-holding feature, for example a table, clamp, collet or other fixture. When the milling machine is in operation, the spindle, the work holding feature, or both the spindle and the work holding feature move with respect to each other in a controlled manner. The rotating cutting tool contacts the work piece and cuts material from the work piece to accomplish the machining operation.

In any machining operation, the accuracy of the finished part depends upon the accuracy of the alignment between the spindle of the machine tool and the work-holding feature of the machine tool. A manual milling machine generally is a milling machine in which the rotating spindle is held securely in a fixed location and a human machinist directly controls the movement of the work holding feature with respect to the rotating spindle. For a manual milling machine, the spindle squaring tools addressed by U.S. Pat. No. 7,069,666 issued Jul. 4, 2006 and U.S. Pat. No. 6,832,440 issued Dec. 21, 2004, both to Joseph Navarro et al, may be used to orient the spindle of the milling machine to the table of the milling machine. U.S. Pat. Nos. 7,069,666 and 6,832,440 are hereby incorporated by reference as if set forth in full herein.

A CNC machine tool provides for the automated machining of parts under the control of a computer. As for a manual milling machine, the cutting tool of a CNC machine tool is attached to a rotating spindle. A work piece is secured to a work-holding feature and the computer causes the work holding feature, the rotating spindle, or both the work holding feature and the rotating spindle to move with respect to each other in a controlled manner.

Because the CNC machine tool is under computer control, the machinist may not attend all operations of the CNC machine and the CNC machine tool may produce multiple parts between inspections. The machinist will not have the same opportunity to, for example, adjust for tool wear that the machinist would have for a manual milling machine. Initial set-up accuracy therefore is even more important for a CNC machine than for a manual milling machine.

While the spindle-aligning tools of the patents incorporated by reference may be used to align the spindle and work holding feature of a CNC machine tool, the nature of CNC machine tools presents special challenges for the machinist. The access to the work holding feature of the CNC machine tool may be more limited than a corresponding manual milling machine, reducing the vantage points from which the machinist may observe a spindle-aligning tool. A prior art alignment tool that utilizes mechanical dial indicators may be read accurately only from directly in front of the dial indicators because the pointer of each indicator is separated from the dial of the indicator. Viewing the dial indicator at an oblique angle results in parallax, rendering the resulting readings inaccurate and unreliable. During aligning of the spindle and work-holding feature, the machinist must change his or her position to read the dial indicators from directly in front of the indicators. The limited access and the requirement to move to avoid parallax may require the machinist to place his or her head within the envelope of motion of the CNC machine tool to physically observe the spindle-aligning tool.

Placing the machinist's head within the envelope of motion of the machine tool presents safety hazards to the machinist. The safety hazards include the risk of unexpected startup of the CNC machine tool and that the spindle of the CNC machine tool may advance unintentionally toward the work holding feature even if all electrical power is cut. If either of these events occurs while the machinist is physically within the range of movement of the CNC machine tool, then the machinist may be injured or killed. Even if the machine tool does not start unexpectedly or if the spindle does not advance unintentionally, the cutting tools, fixtures, work pieces and components of the CNC machine tool are hard, sharp and dirty and are ready to injure the machinist who ventures too close. The physical danger and unpleasant, cramped environment may make the machinist reluctant to enter the envelope of motion of the CNC machine tool and may result in inaccurately set-up CNC machine tools and in rejected machined parts.

III. SUMMARY OF THE INVENTION

The invention is a tool for aligning the work-holding feature of a machine tool, which may be a CNC machine tool, with the spindle of the machine tool. The alignment tool of the invention avoids parallax, improving accuracy, and avoids any requirement that the machinist place his or her head in the envelope of tool movement of the machine tool, improving safety and improving the willingness of the machinist to properly set up the machine tool.

The alignment tool of the invention features a body and a shank attached to the body. The shank can be attached to the spindle of the machine tool so that the longitudinal axis of the shank is collinear with the axis of rotation of the spindle. A first and a second indicator are attached to the body on opposing sides of the shank longitudinal axis. The first and second indicators may be mechanical dial indicators. The first and second indicators each has an indicator tip and an indicator face and each detects movement of the indicator tip parallel to the shank longitudinal axis. The indicator face displays an indicator measurement as detected by the corresponding indicator tip. Each indicator face is connected to the body by a swiveling connection, so that the face may be turned with respect to the body. When the shank is connected to the spindle and the body is 'trammed' by rotating the spindle as discussed below, the indicator faces may be turned to face the machinist, so that the machinist is not required to move with respect to the machine tool to read the indicator faces without significant parallax and regardless of the angular position of the spindle and body.

The first and second indicator tips are equally spaced in a spaced-apart relation on opposing sides of the shank longitudinal axis. The spaced-apart relation is selected to provide an adequate distance between the indicator tips and the longitudinal axis to detect whether the work holding feature is aligned with the spindle to a suitable level of accuracy. In general, the greater the distance between the opposing indicator tips, the greater the accuracy. In general, the spaced apart relation of the two indicator tips is selected to be the largest that can be accommodated by the work holding feature of the machine tool, but any suitable smaller dimension also may be used. A distance between the indicator tips of eight inches has proven suitable in practice.

Each of the first and second indicators each has an indicating face that indicates a distance that the corresponding indicator tip moves along a line of actuation. The lines of actuation of the indicator tips may be linear or may define an arc, provided that the indicator tip has a component of its motion that is parallel to the shank longitudinal axis.

The body may include a bottom surface that falls on a plane normal to the longitudinal axis of the shank. The lines of actuations of the two indicators may pass through the plane of the bottom surface. The alignment tool may be calibrated by placing the bottom surface on a known flat surface, such as a surface plate, and zeroing both of the indicators. Both indicators then are calibrated and ready for use.

In use, the machinist will calibrate the alignment tool and will attach the shank of the calibrated alignment tool to the spindle of the machine tool with the shank longitudinal axis collinear with the spindle axis of rotation. The machinist will align the body of the alignment tool with the 'X' axis of the work holding feature of the machine tool and will swivel the indicator face of each indicator so that the machinist can observe the indicator faces without placing the machinist's head within the envelope of tool movement of the machine tool. The machinist will advance either the work-holding feature or the spindle until the indicator tips contact the work-holding feature. The machinist will observe the indicator faces. If both indicator faces indicate the same measurement or are within the desired tolerance, the work-holding feature is aligned with the spindle to the desired level of accuracy in the selected 'X' axis. If both indicators do not have the same measurement or are not within the desired tolerance, then the work-holding feature is not aligned with the spindle. The machinist will move the work-holding feature or the spindle in the 'X' axis to bring the spindle and work-holding feature into alignment.

The alignment tool is then 'trammed;' that is, the spindle is rotated so that the body of the alignment tool is aligned with the 'Y' axis of the work-holding feature. The machinist will swivel the indicator face of each indicator so that the machinist can observe both of the indicator faces without placing the machinist's head within the envelope of tool movement of the machine tool. The machinist will advance the work-holding feature or the spindle until both indicator tips contact the work-holding feature. If both indicators display the same measurement or are within the desired tolerance, then the work-holding feature is aligned in the 'Y' axis. If the both indicators do not display the same measurement or are not within the desired tolerance, then the work-holding feature or the spindle or both are moved in the 'Y' axis so that both indicators display the same measurement or display measurements within the desired tolerance. The spindle and the work-holding feature are then aligned in the 'Y' axis, completing the alignment of the spindle and the work-holding feature. The spindle and work-holding feature may be aligned in the 'Y' axis prior to being aligned in the 'X' axis.

The two swiveling indicator faces may be connected by a mechanism so that when one indicator face is swiveled by the machinist, the other indicator face also swivels. For example, a pulley may be attached to each of the indicators and the two pulleys may be connected by a belt. When the machinist manually swivels the indicator face of a first indicator, the pulley attached to that indicator face turns, applying tension to one side of the belt, which in turn pulls on the pulley attached to the second indicator face, turning the second indicator face. Both indicator faces are aligned in the same direction when the machinist manually turns either of the indicator faces. The belt may be resilient. As a second example, each indicator may have an attached mechanical crank arm and the two crank arms may be attached by a connecting rod so that both indicators move if the machinist moves one indicator. As a third example, the swiveling indicators may include a friction wheel configured to contact the work holding feature. The wheel rotates by frictional engagement with the work holding feature when the alignment tool is trammed. The friction wheel also is configured to swivel the indicator displays, so that the indicator displays swivel as the alignment tool is trammed.

V. DESCRIPTION OF AN EMBODIMENT

Figure 1:
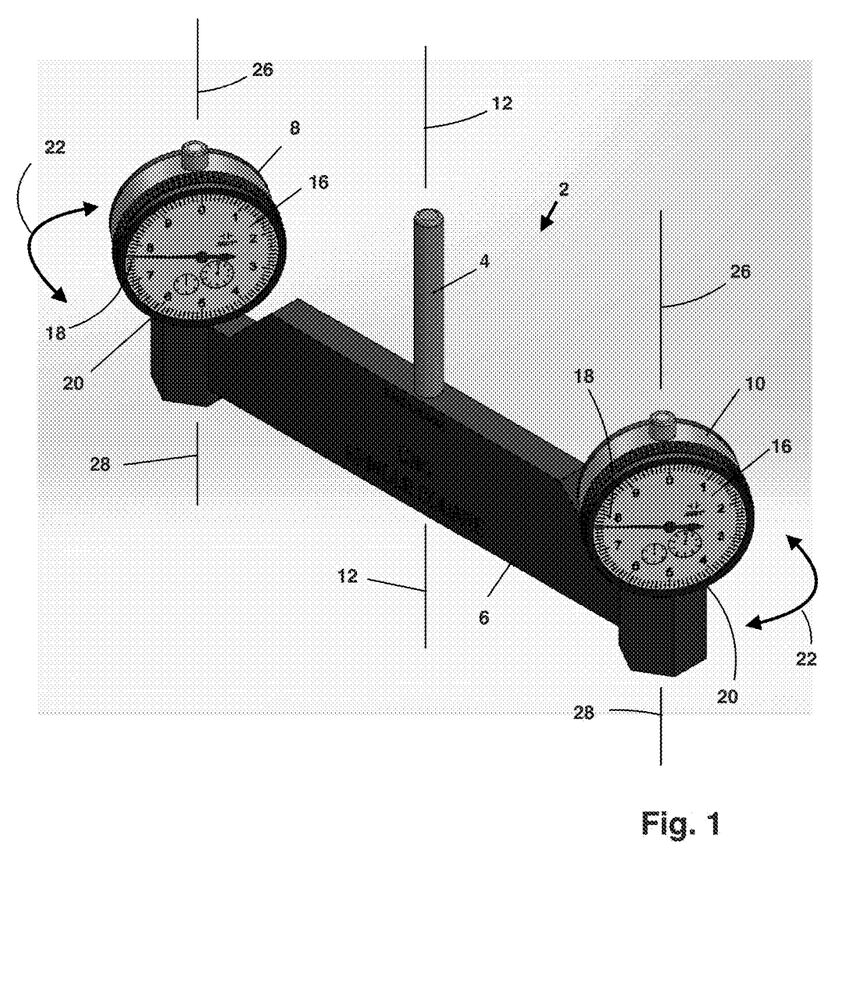
FIG. 1 is a first perspective view of the alignment tool of the invention.
Figure 2:
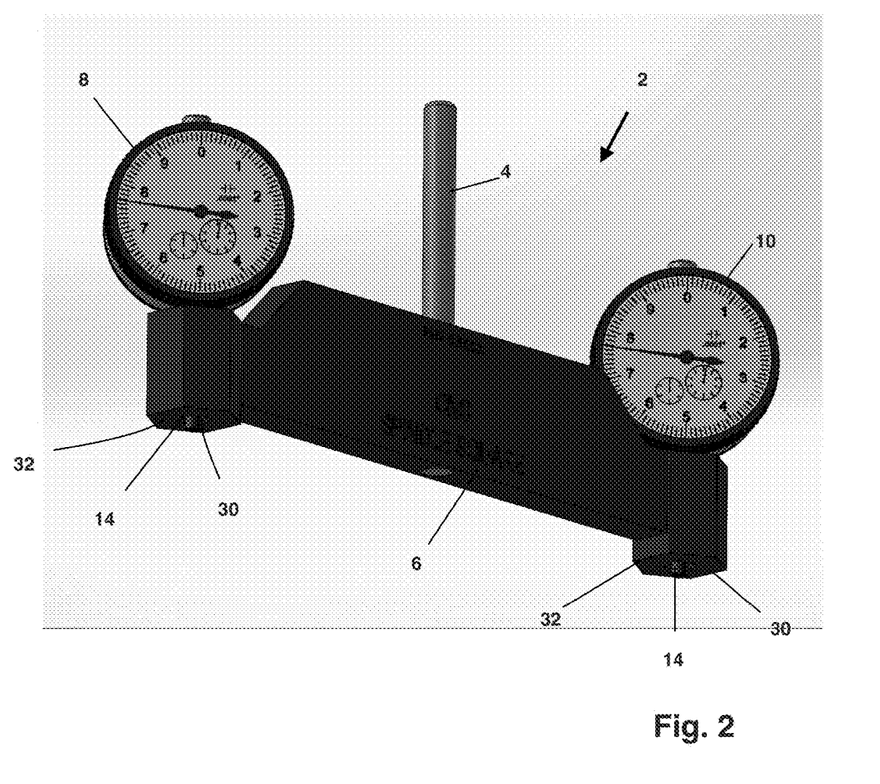
FIG. 2 is a second perspective view of the alignment tool of the invention.
Figure 3:
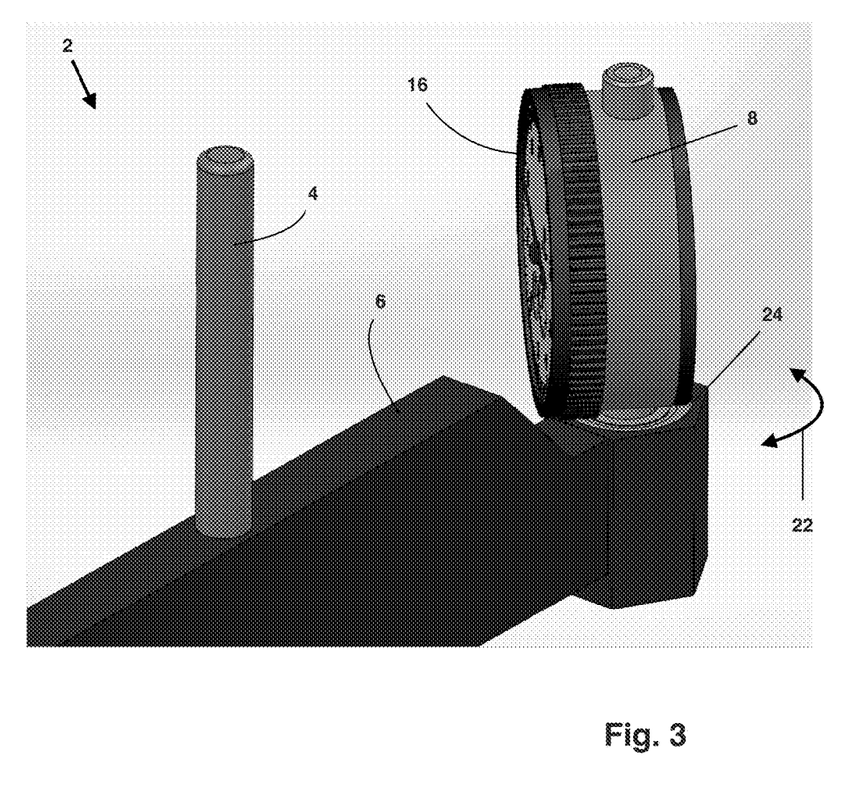
FIG. 3 is a detail third perspective view of the alignment tool of the invention.

FIGS. 1 and 2 are perspective views of the alignment tool 2 of the invention. FIG. 3 is a detail view of the alignment tool 2. As shown by FIGS. 1-3, the alignment tool 2 includes a shank 4 and a body 6. The shank 4 is attached to the body 6. A first indicator 8 and a second indicator 10 are attached to and supported by the body 6. The shank 4 defines a shank longitudinal axis 12.

Each of the first and second indicators 8, 10 defines an indicator tip 14, shown by FIGS. 2, 4, 5 and 6. Each indicator tip 14 moves along a line of actuation 28. The line of actuation 28 may be linear, as illustrated by FIG. 1, or may define an arc. Any line of actuation 28 may be used, provided that the movement of the indicator tip 14 through its range of motion includes a motion component that is parallel to the shank longitudinal axis 12.

Each indicator 8, 10 includes an indicator face 16 that discloses an indicator measurement 18. The indicator measurement 18 displays motion of the corresponding indicator tip 14 along the line of actuation 28. Each indicator face 16 is attached to the body 6 with a swiveling connection 20 and is configured to swivel with respect to the body 6 as illustrated by arrows 22. FIGS. 1-4 illustrate the indicator faces 16 in different swivel positions with respect to the body 6. The swivel connections 20 generally allow the indicator faces 18 to rotate with respect to the body 6 about indicator axes of rotation 26 that are generally parallel to the shank longitudinal axis 12. The swiveling of the indicator faces 18 about the indicator axes of rotation 26 is illustrated by arrows 22.

The swiveling connection 20 is achieved by bearings 24 joining the indicator face 16 and the body 6, which may be roller bearings or ball bearings. The bearings 24 are illustrated by FIG. 3 and the cutaway side view of FIG. 4. The bearings 24 are precision bearings and are attached to the first and second indicators 8, 10 and press-fit into the body 6. The press-fit of bearings 24 pre-loads the bearing 24, removing any play between the components of the bearing 24 and allowing the first and second indicators 8, 10 to swivel while maintaining adequate measurement accuracy.

The body 6 has a bottom surface 30 that defines a plane 32. The plane 32 is normal to the spindle longitudinal axis 12. Each indicator tip 14 travels along its line of actuation 28 as the indicator tip 14 moves through its range of motion. The lines of actuation 28 of the indicator tips 14 intersect the plane 32. To calibrate the alignment tool 2, the machinist places the bottom surface 30 of the body 6 defining the plane 32 on a known flat surface, for example, a granite surface plate. The surface plate urges the indicator tips 14 so that the indicator tips 14 are disposed on the plane 32. The machinist then zeroes each indicator 8, 10, thus calibrating the alignment tool 2.

Figure 4:
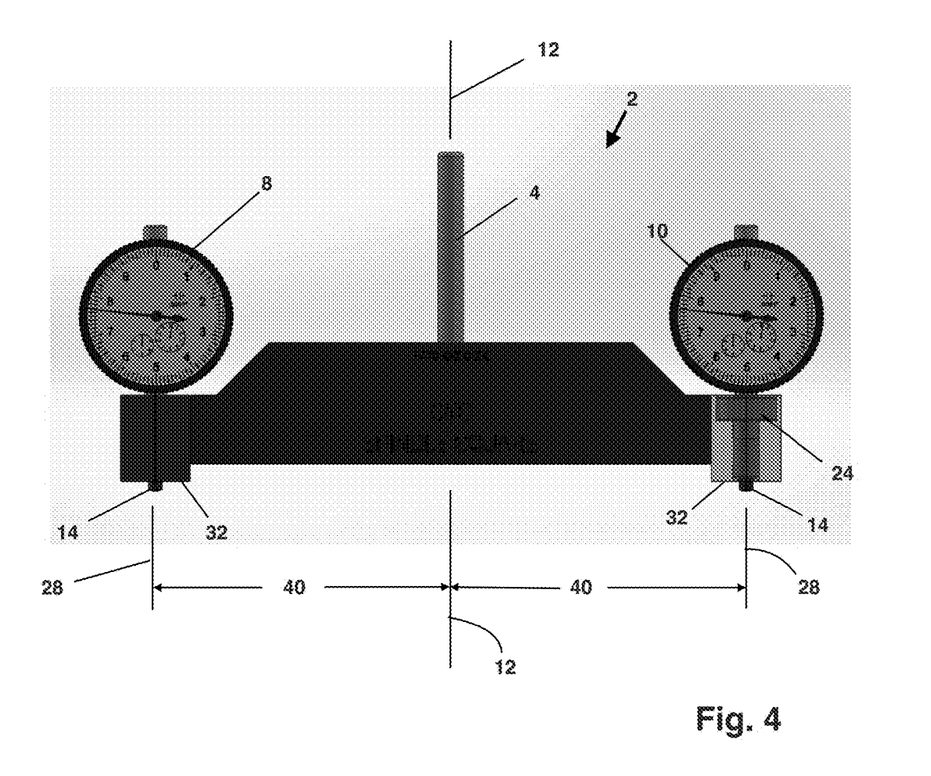
FIG. 4 is a cutaway side view of the alignment tool of the invention.

FIG. 4 illustrates that the indicator tips 14 of the first and second indicators 8, 10 are in a spaced-apart relation 40 to the shank longitudinal axis 12 and to each other. The spaced apart relation 40 is selected so that the alignment tool 2 is capable of aligning the spindle 34 and work-holding feature 38 of the machine tool, shown by FIG. 5, to a desired accuracy. In general, the greater the distance between the indicator tips 14 on opposing sides of the shank longitudinal axis 12, the more accurate the alignment tool 2 will be, all other factors being equal. The spaced-apart relation 40 is limited by physical constraints; namely, the spaced-apart relation 40 cannot exceed the size of the work-holding feature 38. As used in this document, the term 'spaced apart relation' means the distance between the indicator tips 14 and the shank longitudinal axis 12 on opposing sides of the longitudinal axis 12 that allows the alignment tool 2 to achieve a desired measurement accuracy.

Figure 5:
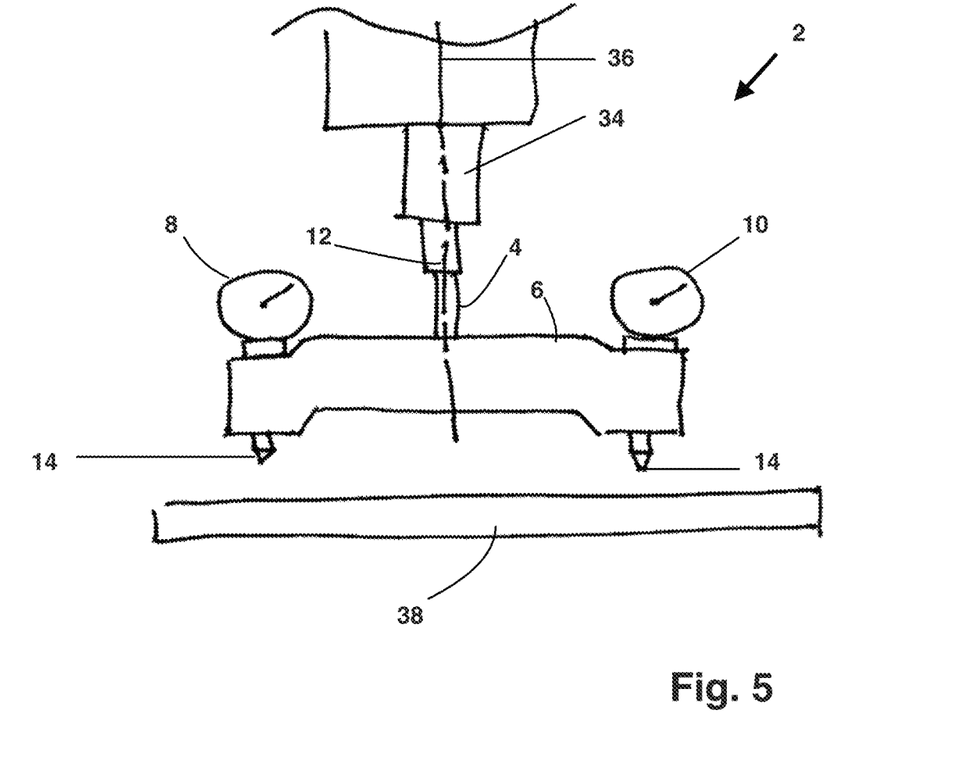
FIG. 5 is a perspective view of the alignment tool of the invention mounted to the spindle of a CNC machine tool.

As shown by FIG. 5, to align the spindle 34 of a machine tool and the work-holding feature 38 of the machine tool using the alignment tool 2 of the invention, the machinist will attach the shank 4 to the spindle 34 so that the shank longitudinal axis 12 is collinear with the spindle axis of rotation 36. The machinist will orient the body 6 of the alignment tool 2 so that the body 6 is aligned with the 'X' axis or the 'Y' axis of the work-holding feature 38 and will swivel the indicator faces 16 so that the machinist can read both indicator faces 16 from a selected location. The machinist will advance the spindle 34 toward the work-holding feature 38 until the indicator tips 14 of the indicators 8, 10 contact the work-holding feature 38. If the indicator measurements 18 are the same for both indicators 8, 10 or are within the desired range of accuracy, then the spindle 34 and work-holding feature 38 are adequately aligned in the selected 'X' or 'Y' dimension. If the indicator measurements 18 are not the same or are not within the desired range of accuracy, the machinist will adjust the spindle 34 or work-holding feature 38 until the indicator measurements 18 are the same or within the desired range of accuracy, aligning the spindle 34 and work-holding feature 38 in the selected 'X' or 'Y' dimension.

The machinists will then tram the alignment tool 2 by rotating the spindle 34 about its axis of rotation 36 until the body 6 of the alignment tool 2 is aligned in the other of the 'X' and 'Y' dimensions of the work-holding feature 38. The machinist will swivel the first and second indicators 8, 10 so that the machinist can read the indicator faces 16. The machinist will advance the spindle 34 until the indicator tips 14 contact the work-holding feature 38. If the indicator measurements 18 are the same or are within the desired range of accuracy, then the spindle 34 and work-holding feature 38 are aligned. If the indicator measurements 18 are not the same or is not within the desired range of accuracy, then the machinist will adjust the alignment of the spindle 34 and the work-holding feature 38 in the other of the 'X' and 'Y' dimensions until equal measurements or measurements within the desired range of accuracy are achieved.

Because the machinist may swivel the indicator faces 16 to be read from any direction, the machinist can remain in a single position to align the spindle 34 and work-holding feature 38. The machinist is not required to move to a second or third position to read the indicator faces 16 and is not required to move his or her head into the envelope of tool movement of the machine tool to read the indicator faces 16. Because the indicator faces 16 may be placed in any desired orientation prior to rotating the spindle 34 to align the body 6 with the 'X' or 'Y' dimensions of the work-holding feature 38, the machinist is not required to place his or her hands into the machine tool beyond the spindle 34, increasing safety and comfort for the machinist.

Figure 6:
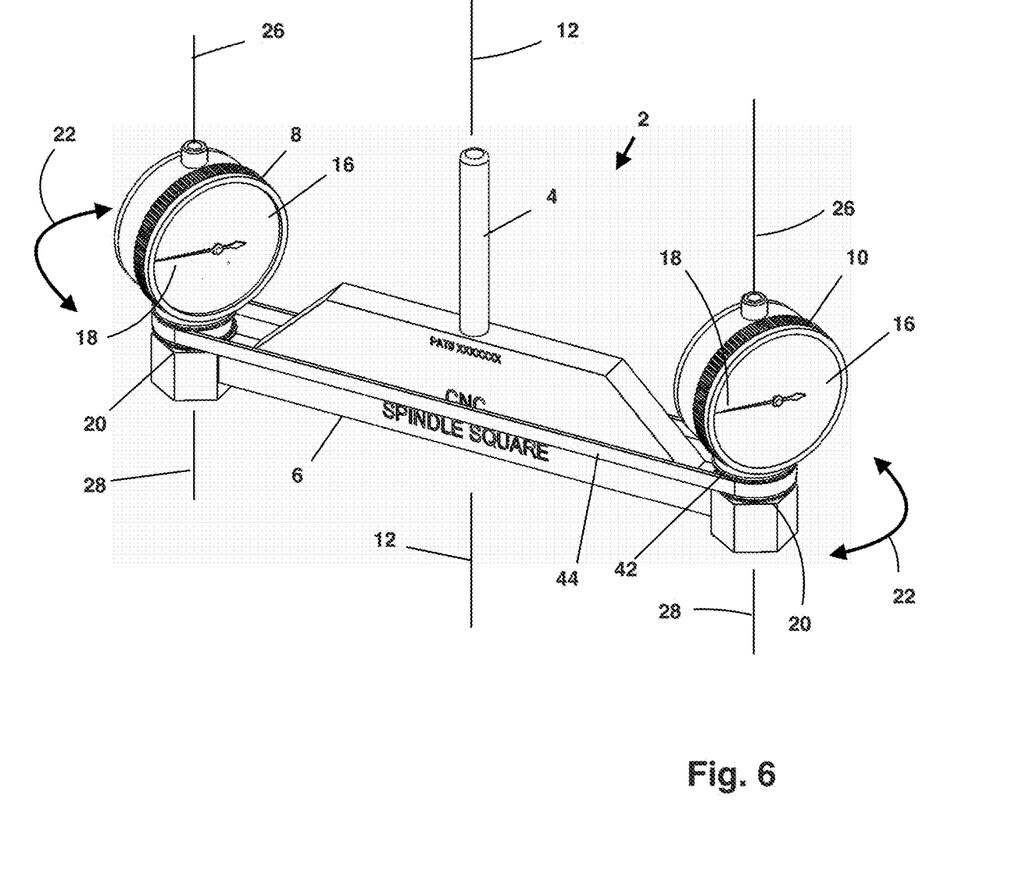
FIG. 6 is a detail perspective view of the alignment tool having a mechanism for simultaneous swiveling of the indicators.
Figure 8:
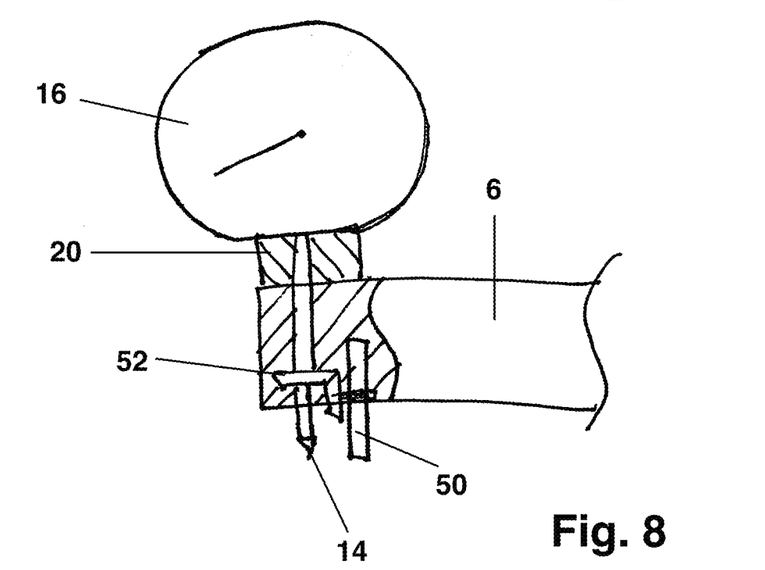
FIG. 8 is a detail cutaway of the friction wheel to turn the indicator face.
Figure 9:
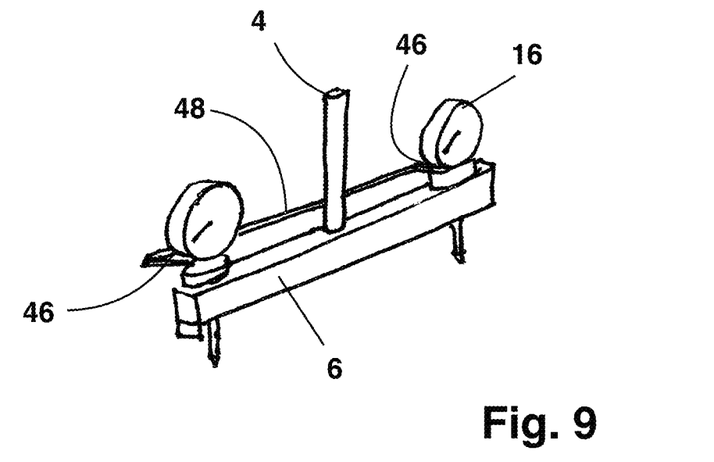
FIG. 9 is a perspective view of crank arms and a connecting rod to turn the indicator faces.

As shown by FIGS. 6, 8 and 9, the alignment tool 2 may be equipped with features that cause one of the indicators 8, 10 to swivel when the other of the indicators 8, 10 is swiveled by the machinist. As a result, the machinist is required to swivel only one of the indicator faces 16 and not both indicator faces 16, increasing convenience to the machinist. In the example of FIG. 6, a pulley 42 is attached to each indicator face 16 and swivels with each indicator face 16. A belt 44 connects the two pulleys 34. The belt 44 may be resilient. When the machinist swivels one indicator face 16, the pulley 42 rotates, moving the belt 44 and causing the other indicator face 16 also to swivel, in the same direction and by the same amount. As shown by FIG. 9, another iteration may be a crank arm 46 attached to each of the two indicator faces 16 and a connecting rod 48 joining the two crank arms. Movement of one indicator face 16 thus moves the crank arms 46 and connecting rod 48 and moves the other indicator face 16.

Figure 7:
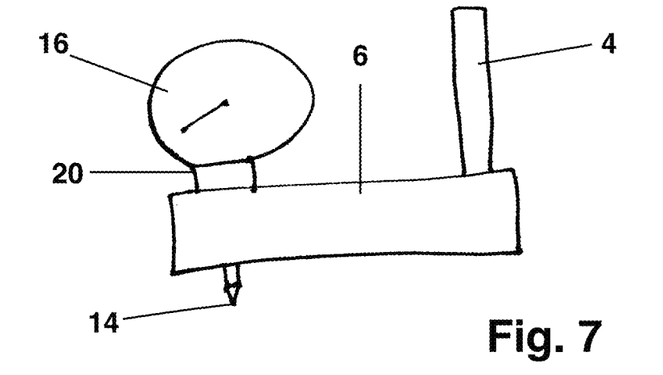
FIG. 7 is a side view of a single indicator embodiment of the alignment tool.

From FIG. 7, the alignment tool 2 may include a single indicator 8 that can be attached to the spindle 34 of the machine tool in a spaced apart relation to the axis of rotation 36 of the spindle 34. The single-indicator embodiment may include a shank 4 that can be attached to the spindle 34 and that has a longitudinal axis 12 that is collinear with the axis of rotation 36 of the spindle 34. The single-indicator embodiment also may include a body 6 that is attached to the shank 4 and that supports the single indicator 8. The single indicator face 16 is rotatably attached to the body 6. The axis of rotation 26 of the indicator face 16 is generally parallel to the longitudinal axis 12 of the shank 4. The single indicator embodiment is configured similarly to the two indicator embodiments of FIGS. 1 through 5 with one of the indicators 8, 10 omitted.

In use of the single indicator embodiment, a machinist will attach the shank 4 of the alignment tool 2 to the spindle 34 of the machine tool. The machinist will turn the indicator face 16 toward the machinist and advance the spindle 34 or the work holding feature 38 until the indicator tip 14 of the single indicator 8 contacts the work holding feature 38. The machinist will note the measurement indicated by the indicator face 16. The machinist will tram alignment tool 2 by rotating the spindle 34 of the machine tool until the indicator tip 14 is located on the opposite side of the spindle 34 of the machine tool. The machinist will turn the indicator face 16 so that the indicator face 16 is pointed toward the machinist so that the machinist can read the indicator face 16. The machinist will compare the measurements 18 indicated by the indicator face 16 for the two locations on opposing sides of the spindle axis of rotation 36.

From FIG. 8, the indicator faces 16 may rotate automatically. A friction wheel 50 is configured to contact the work-holding feature and to turn when the alignment tool 2 is trammed. The rotating friction wheel 50 has a frictional or geared attachment to an indicator face 16, causing the indicator face 16 to turn while the machinist trams the alignment tool. FIG. 8 illustrates two beveled gears 52 connecting the friction wheel 50 to the indicator face 16. The gear ratios or friction wheel 50 sizes are selected so that the indicator face 16 will make one full rotation with each rotation of the spindle 34, so that the indicator face 16 is visible from the same direction as the spindle 34 is rotated about its axis of rotation 36.

LIST OF ELEMENTS

The following is a list of numbered elements from the drawings and specification.
2 alignment tool
4 shank
6 body
8 first indicator
10 second indicator
12 shank longitudinal axis
14 indicator tip
16 indicator face
18 indicator measurement
20 swiveling connection
22 arrows
24 bearing
26 indicator axes of rotation
28 line of actuation
30 bottom surface of the body
32 plane of the bottom surface
34 spindle
36 spindle axis of rotation
38 work-holding feature
40 spaced-apart relation
42 pulley
44 belt
46 crank arm
48 connecting rod
50 friction wheel
52 gears

I claim:

1. An alignment tool to align a spindle of a machine tool with a work holding feature of the machine tool, the spindle having a spindle axis of rotation, the alignment tool comprising:
   a. an indicator, said indicator being configured for selectable attachment to the spindle,
   b. said indicator having an indicator tip, said indicator being configured to detect a motion of said indicator tip parallel to the spindle axis of rotation when said indicator is attached to the spindle of the machine tool,
   c. said indicator having an indicator face, said indicator face being configured to display said motion of said indicator tip,
   d. said indicator face being rotatable about an indicator axis of rotation, said indicator axis of rotation being generally parallel to said spindle axis of rotation when said indicator is attached to the spindle of the machine tool, said indicator axis of rotation being a spaced apart relation to said spindle axis of rotation, whereby a machinist may rotate said indicator face so that said machinist may read said indicator face when said indicator is attached to the spindle of the machine tool.

2. The alignment tool of claim 1 wherein the indicator is a first indicator, the indicator tip is a first indicator tip, the indicator face is a first indicator face and the indicator axis of rotation is a first indicator axis of rotation, the alignment tool further comprising:
   a. a second indicator, said second indicator being configured for selectable attachment to the spindle,
   b. said second indicator having a second indicator tip, said second indicator being configured to detect said motion of said second indicator tip parallel to the spindle axis of rotation when said first indicator and said second indicator are reattached to the spindle of the machine tool,
   c. said second indicator having a second indicator face, said second indicator face being configured to display said motion of said second indicator tip,
   d. said second indicator face being rotatable about a second indicator axis of rotation, said second indicator axis of rotation being generally parallel to the spindle axis of rotation when said second indicator is attached to the spindle of the machine tool, whereby a machinist may rotate said second indicator face so that said machinist may read said second indicator face when said second indicators is attached to the spindle of the machine tool.

3. The alignment tool of claim 2 wherein said first indicator axis of rotation and said second spindle axis of rotation are in a spaced apart relation and are disposed on opposing sides of the spindle axis of rotation when said first and second indicators are attached to the spindle of the machine tool.

4. The alignment tool of claim 3, the alignment tool further comprising: a body, said body being selectably attachable to the spindle of the machine tool, said body supporting said first indicator and said second indicator when said body is attached to the spindle of the machine tool so that said first and said second indicator axes of rotation are generally parallel to the spindle axis of rotation.

5. The alignment tool of claim 4, the alignment tool further comprising: a shank, said shank being attached to said body, said shank being configured for attachment to the spindle of the machine tool, said shank having a shank longitudinal axis, said shank longitudinal axis being collinear with the spindle axis of rotation when said shank is attached to the spindle of the machine tool, said first and second indicator axes of rotation being parallel to said shank longitudinal axis.

6. The alignment tool of claim 5 wherein said motion of each of said first and second indicator tips is along a line of actuation, said first indicator being configured to determine a first measurement of said first indicator tip along said first indicator tip line of actuation, said second indicator being configured to determine a second measurement of said second indicator tip along said second indicator tip line of actuation, said first indicator face being configured to display said first measurement, said second indicator face being configured to display said second measurement.

7. The alignment tool of claim 6 wherein said first and said second indicator faces are mechanical dials.

8. The alignment tool of claim 7 wherein said body includes a bottom surface that defines a plane, said plane being normal to said shank longitudinal axis, said line of actuation of said first indicator tip and said line of actuation of said second indicator tip intersecting said plane.

9. The alignment tool of claim 5, the alignment tool further comprising:
   a. a first pulley, said first pulley being attached to said first indicator;
   b. a second pulley, said second pulley being attached to said second indicator;
   c. a belt connecting said first and second pulleys, whereby rotation of the first or the second indicator causes another of said first and second indicators to rotate.

10. The alignment tool of claim 5, the alignment tool further comprising:
    a. a first crank arm, said first crank arm being attached to said first indicator;
    b. a second crank arm, said second crank arm being attached to said second indicator;
    c. a connecting rod attaching said first crank arm and said second crank arm, whereby rotation of one of said first and second indicators causes another of said first and second crank arms to rotate.

11. The alignment tool of claim 5, the alignment tool further comprising: a friction wheel attached to said body, said friction wheel being configured to frictionally engage the work holding feature and to rotate when said shank is connected to the spindle and the spindle is rotated, said friction wheel being configured to rotate said first indicator face or said second indicator face as said friction wheel rotates.

12. A method of aligning the spindle of a machine tool with a work holding feature of the machine tool, the spindle having a spindle axis of rotation, the method comprising:
    a. providing a first indicator, said first indicator being configured for selectable attachment to the spindle, said first indicator having a first indicator tip, said first indicator being configured to detect a motion of said first indicator tip parallel to the spindle axis of rotation when said first indicator is attached to the spindle of the machine tool, said first indicator having a first indicator face, said first indicator face being configured to display said motion of said first indicator tip, said first indicator face being rotatable about a first indicator axis of rotation, said first indicator axis of rotation being generally parallel and in a spaced apart relation to said spindle axis of rotation when said first indicator is attached to the spindle of the machine tool, whereby a machinist may rotate said first indicator face so that said machinist may read said first indicator face when said first indicator is attached to the spindle of the machine tool;
    b. providing a second indicator, said second indicator being configured for selectable attachment to the spindle, said second indicator having a second indicator tip, said second indicator being configured to detect said motion of said second indicator tip parallel to the spindle axis of rotation when said first indicator and said second indicator are reattached to the spindle of the machine tool, said second indicator having a second indicator face, said second indicator face being configured to display said motion of said second indicator tip, said second indicator face being rotatable about a second indicator axis of rotation, said second indicator axis of rotation being generally parallel and in a spaced apart relation to the spindle axis of rotation when said second indicator is attached to the spindle of the machine tool, whereby said machinist may rotate said second indicator face so that said machinist may read said second indicator face when said second indicators is attached to the spindle of the machine tool;
    c. attaching said first and said second indicators to the spindle;
    d. rotating said first and said second indicator faces until said first and second indicator faces are oriented for observation by said machinist;
    d. advancing the spindle or the work holding feature until said first indicator tip and said second indicator tip contact the work holding feature;
    e. observing said first and said second indicator faces;
    f. comparing said motion of said first indicator tip and said second indicator tip as indicated by said first indicator face and said second indicator face.

13. The method of claim 12 wherein said first indicator axis of rotation and said second spindle axis of rotation are in a spaced apart relation and are disposed on opposing sides of the spindle axis of rotation when said first and second indicators are attached to the spindle of the machine tool.

14. The method of claim 13, the method further comprising:
    providing a body, said body being selectably attachable to the spindle of the machine tool, said body supporting said first indicator and said second indicator when said body is attached to the spindle of the machine tool so that said first and said second indicator axes of rotation are generally parallel to the spindle axis of rotation.

15. The method of claim 14, the method further comprising: providing a shank, said shank being attached to said body, said shank being configured for attachment to the spindle of the machine tool, said shank having a shank longitudinal axis, said shank longitudinal axis being collinear with the spindle axis of rotation when said shank is attached to the spindle of the machine tool, said first and second indicator axes of rotation being parallel to said shank longitudinal axis.

16. The method of claim 15 wherein said motion of each of said first and second indicator tips is along a line of actuation, said first indicator being configured to determine a first measurement of said first indicator tip along said first indicator tip line of actuation, said second indicator being configured to determine a second measurement of said second indicator tip along said second indicator tip line of actuation, said first indicator face being configured to display said first measurement, said second indicator face being configured to display said second measurement.

17. The method of claim 16 wherein said first and said second indicator faces are mechanical dials.

18. The method of claim 16 wherein said body includes a bottom surface that defines a plane, said plane being normal to said shank longitudinal axis, said line of actuation of said first indicator tip and said line of actuation of said second indicator tip intersecting said plane.

19. The method of claim 16 wherein said step of rotating said first and said second indicators comprises: rotating one of said first and second indicators, said first indicator including a first pulley, said second indicator including a second pulley, a belt joining said first and said second pulleys, whereby rotation of the first or the second indicator causes one of said first and second pulleys to rotate, which causes another of said first and second indicators to rotate, displaying both of said first and second indicator faces to said machinist.

20. The method of claim 16 wherein said step of rotating said first and said second indicators comprises: rotating one of said first and second indicators, said first indicator including a first crank arm, said second indicator including a second crank arm, a connecting arm joining said first and said second crank arms, whereby rotation of the first or the second indicator causes one of said first and second crank arms to rotate, which causes another of said first and second indicators to rotate, displaying both of said first and second indicator faces to said machinist.

\* \* \* \* \*